Jan. 19, 1937. P. SPENCE 2,067,953
VALVE
Original Filed June 22, 1931  5 Sheets-Sheet 3

INVENTOR
Paulsen Spence
BY
Mitchell & Bechert
ATTORNEY

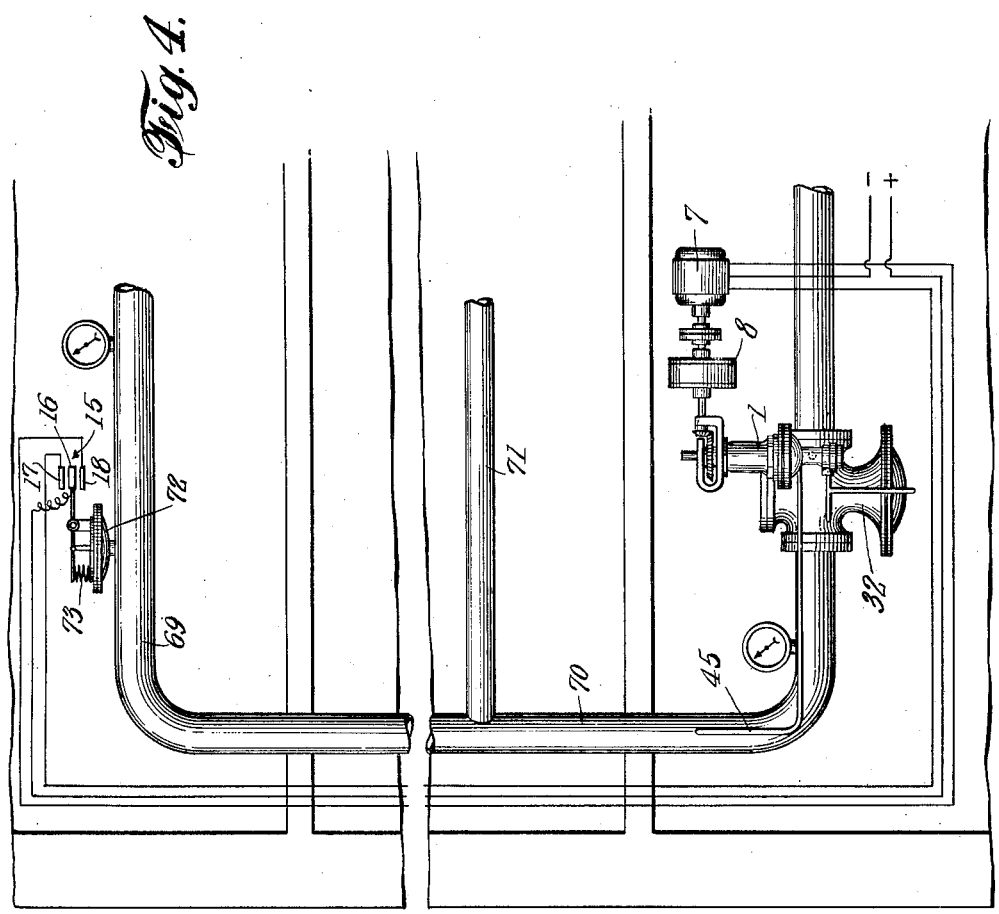

Jan. 19, 1937.                P. SPENCE                2,067,953
                                VALVE
                    Original Filed June 22, 1931        5 Sheets-Sheet 5
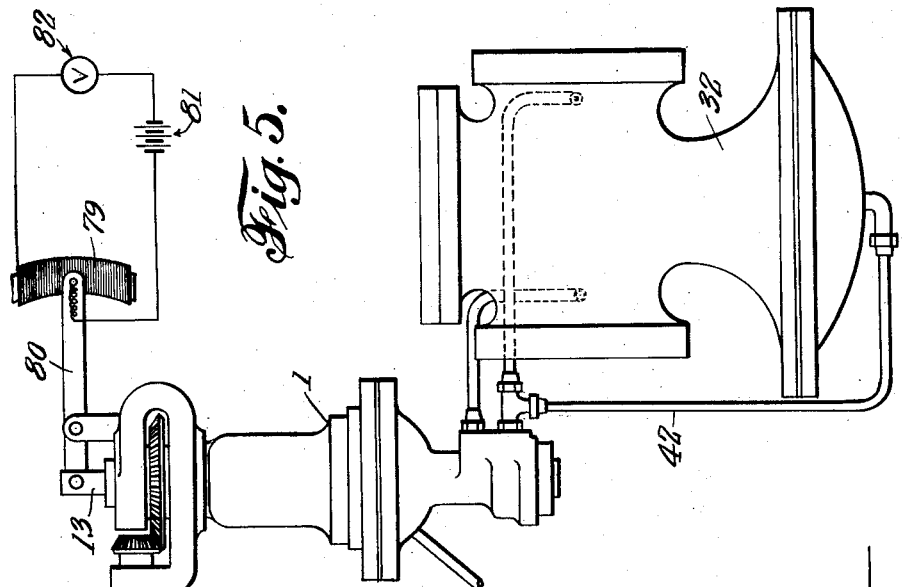
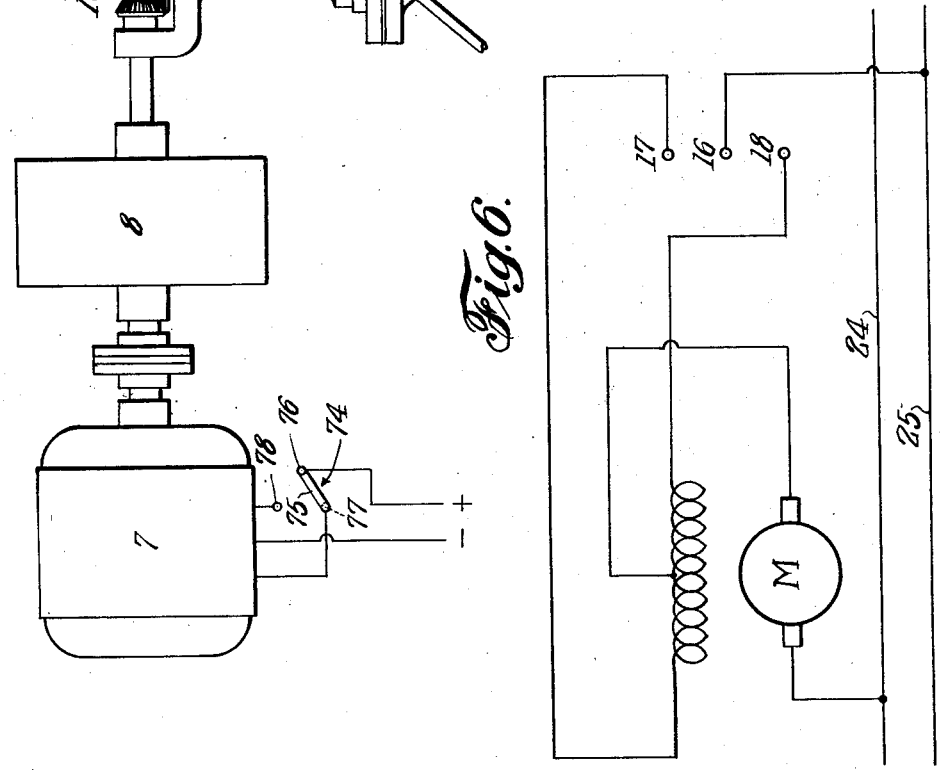
INVENTOR
Paulsen Spence
BY
Mitchell & Bechert
ATTORNEY Patented Jan. 19, 1937

2,067,953

UNITED STATES PATENT OFFICE 2,067,953

VALVE

Paulsen Spence, East Orange, N. J.

Application June 22, 1931, Serial No. 545,931
Renewed February 26, 1935

7 Claims. (Cl. 236—84)

My invention relates to an automatic valve, and more particularly to an automatic valve in which the loading of the valve is automatically or readily varied.

Automatic valves are generally made so that their loading may be varied by hand as by altering the position of a weight or the tension of a spring. When the loading is varied the conditions under which the valve will operate are correspondingly changed. A change in the loading of a reducing valve, for instance, will correspondingly change the fluid pressure on the outlet side of the valve.

It is an object of my invention to provide means for automatically altering the loading of an automatic valve.

It is a further object of my invention to provide electrically operated means for altering the loading of an automatic valve.

It is a further object of my invention to provide means for automatically altering the loading of a reducing valve so that the loading will vary in inverse relation to the temperature at some particular point.

Other objects and features of the invention will be pointed out or will become apparent upon a reading of the specification.

My invention is particularly useful in connection with a steam heating system supplied with steam through a pressure reducing valve and in which it is desired to increase the steam pressure as the temperature of the outside air decreases.

In the drawings which show, for illustrative purposes only, preferred forms of the invention—

Fig. 4 is a view in elevation of a modified method of controlling the device shown in Fig. 1 so that the loading of a spring loaded valve is automatically varied inversely with the pressure at a particular point.

Fig. 5 is a view in elevation of a modification in which the loading of a spring loaded valve is controlled by hand from a remote point by electrically operated means.

Fig. 6 is a diagram showing the electrical connections in Figs. 1 to 4 inclusive.

Figure 1:
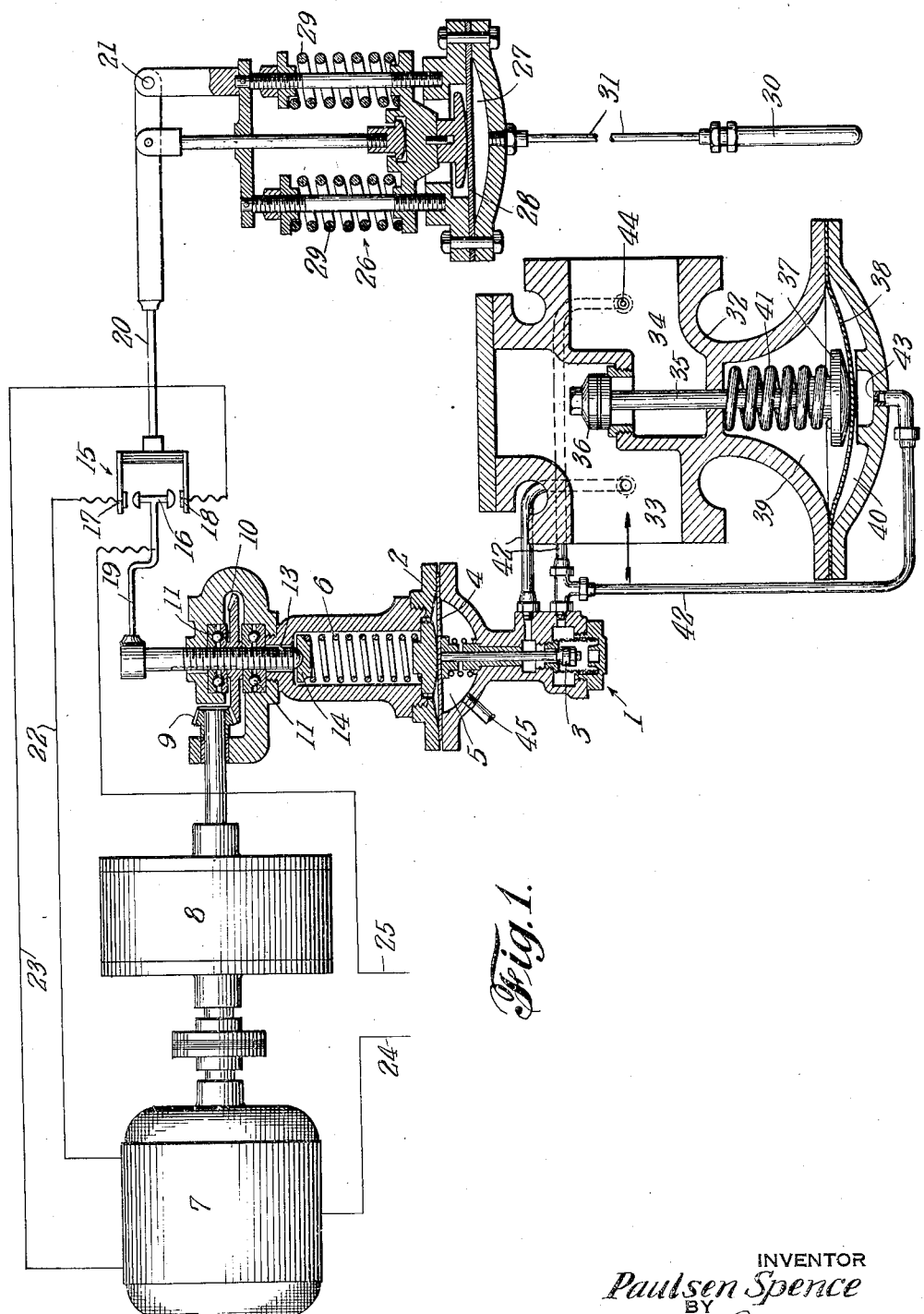
Fig. 1 is a central sectional view, partly in elevation, of an automatic valve having a spring loaded pilot valve in which the normal tension of the spring is automatically varied inversely with the temperature at a particular point.

In Fig. 1, I represents generally a valve having a valve body 2. 3 represents a valve head, the motion of which is controlled by a fluid pressure actuated means. The valve head 3 follows the motion of the fluid actuated means either by being connected to such means or by being constantly pressed against such means by means of a spring. In the form shown in the drawings the fluid pressure actuated means is a diaphragm 4 which is actuated in one direction by fluid pressure in the diaphragm chamber 5. The fluid pressure actuated means 4 is operated in the opposite direction by suitable loading means. In the form shown, this loading means consists of a spring 6. Automatic means are provided whereby the spring 6 will be compressed or decompressed independently of the fluid pressure in the chamber 5. Thereby the normal loading of the valve will be altered. In the form shown in the drawing an electric motor 7 operates through reduction gearing 8 to compress or decompress the spring 6.

Fixed to a driving shaft on the reduction gearing 8 is a bevel pinion 9 which meshes with a bevel gear 10 which is held between thrust bearings 11—11 and has a bore therethrough. This bore is threaded to engage the thread of a screw 13. The screw 13 is splined to the body 2. The end of the screw 13 bears against a spring follower 14 so that rotation of the pinion 9 compresses or decompresses the spring 6.

The motor 7 may be started in either direction, or stopped, by means of a switch 15. Fig. 6 shows a typical wiring diagram for use with direct current.

As shown, the switch 15 has three contacts, 16, 17, and 18, which are arranged so that the center contact can be contacted with either of the outside contacts. The two outside contacts are connected together but are insulated from each other. Either the center contact or the outside contacts are attached to but insulated from the screw 13 by means of an arm 19 which is made of elastic material. The remaining contact or contacts are attached to a lever 20 which is pivoted at 21. In the drawings the center contact 16 is attached to the arm 19 and contacts 17 and 18 are attached to the lever 20. 22 and 23 are electric conductors leading from the switch 15 to the motor 7. 24 and 25 are line wires leading to a source of electrical supply. The windings of the motor 7 are so arranged that when contact is made between contacts 16 and 17 the motor runs in the direction to compress the spring 6, and when contact is made between contacts 16 and 18 the motor runs in a direction to decompress the spring 6.

The lever 20 is operated by a thermostat. In the form shown, this is the thermostat 26, having a diaphragm chamber 27, a diaphragm 28, and springs 29. A thermostat bulb 30 is connected by means of a pipe 31 to the diaphragm chamber 27. The parts 30, 31 and 27 together form a closed chamber in which is confined a quantity of a fluid which expands as its temperature increases. The thermostat bulb 30 will ordinarily be placed where it is exposed to the temperature of the outside air, but it may be placed in any other location the temperature at which is to control the valve.

The apparatus thus far described operates as follows. If the temperature of the outside air becomes less, the pressure in the diaphragm chamber 27 is correspondingly lessened. The springs 29 move the lever 20 so as to make contact between the contacts 16 and 17 so that the motor 7 operates to compress the spring 6. As the motor operates, the screw 13 will carry the arm 19 downward so as to break the contact between the contacts 16 and 17 after the spring 6 has been slightly compressed. If the outdoor temperature falls further this process will be repeated and the spring 6 will be further compressed. Similarly, if the outdoor temperature increases, the lever 20 will be moved by the pressure in the diaphragm chamber 27 against the tension of the springs 29 so as to close contact between the contacts 16 and 18. The motor 7 will then operate in the opposite direction so as to decompress the spring 6 until the screw 13 carries the arm 19 upward sufficiently so as to break the contact between the contacts 16 and 18. From the foregoing description it will be seen that the spring 6 will at all times be compressed in inverse relation to the temperature of the outside air.

When the valve 1 is used as a direct acting reducing valve and its diaphragm chamber 5 is connected to its outlet side, the pressure on the outlet side will be varied in inverse relation to the outside temperature.

The valve which I have described may be used as a pilot valve for controlling a pressure reducing valve as shown in Fig. 1. 32 represents the body of a main valve which may be of any type but is preferably of the type disclosed in my co-pending application Serial No. 366,837, filed May 29, 1929. The body 32 has an inlet chamber 33 and an outlet chamber 34. 35 is a valve stem to which is attached a valve head 36 and a disc 37. Coacting with the disc 37 is a flexible diaphragm 38. The diaphragm is contained in a diaphragm chamber which may be integral with the body 32. The diaphragm divides the diaphragm chamber into two chambers 39 and 40 which, for convenience, I shall term the upper and lower diaphragm chambers respectively. A spring 41 may be placed preferably in one of the diaphragm chambers for the purpose of keeping the disc 37 in contact with the diaphragm 38, and so as to close the valve in case the pressure on both sides of the valve becomes equalized. Communication is provided between the outlet chamber 34 and the diaphragm chamber 39 by loosely fitting the valve stem 35 in the body 32 so that the fluid in the outlet chamber 34 will leak past the valve stem 35 into the diaphragm chamber 39. The outlet side of the valve is connected to a heating system. 42 is a fluid conducting means leading from the inlet chamber 33 to the diaphragm chamber 40 and also to the outlet chamber 34. The fluid conducting means 42 opens into the diaphragm chamber 40 through a restricted orifice 43 and opens into the outlet chamber 34 through a restricted orifice 44. The pilot valve 1 is interposed in the fluid conducting means 42. 45 is a control pipe leading from the outlet chamber 34 to the pilot valve diaphragm chamber 5.

It will be seen that when the system is in equilibrium any additional compression of the pilot valve spring 6 will cause the pilot valve to open wider and will permit more pressure fluid to flow into the lower diaphragm chamber 40 thus causing the main valve to open wider. Similarly, any decrease in the compression of the pilot valve spring 6 will permit the pilot valve to partially close, thus cutting down the supply of pressure fluid to the lower diaphragm chamber 40. The pressure of the fluid in the lower diaphragm chamber 40 will then be reduced by drainage into the outlet chamber 34 through the pipe connecting the orifices 43 and 44, thus allowing the main valve to partially close. Since, as already pointed out, the compression of the pilot valve spring 6 varies in inverse relation to the outside temperature, it follows that the pressure on the outlet side of the main valve will also vary in inverse relation to the outside temperature, thereby accomplishing an automatic regulation of the pressure in the heating system so as to maintain an equable temperature in the building or other space which is heated by the heating system.

Figure 2:
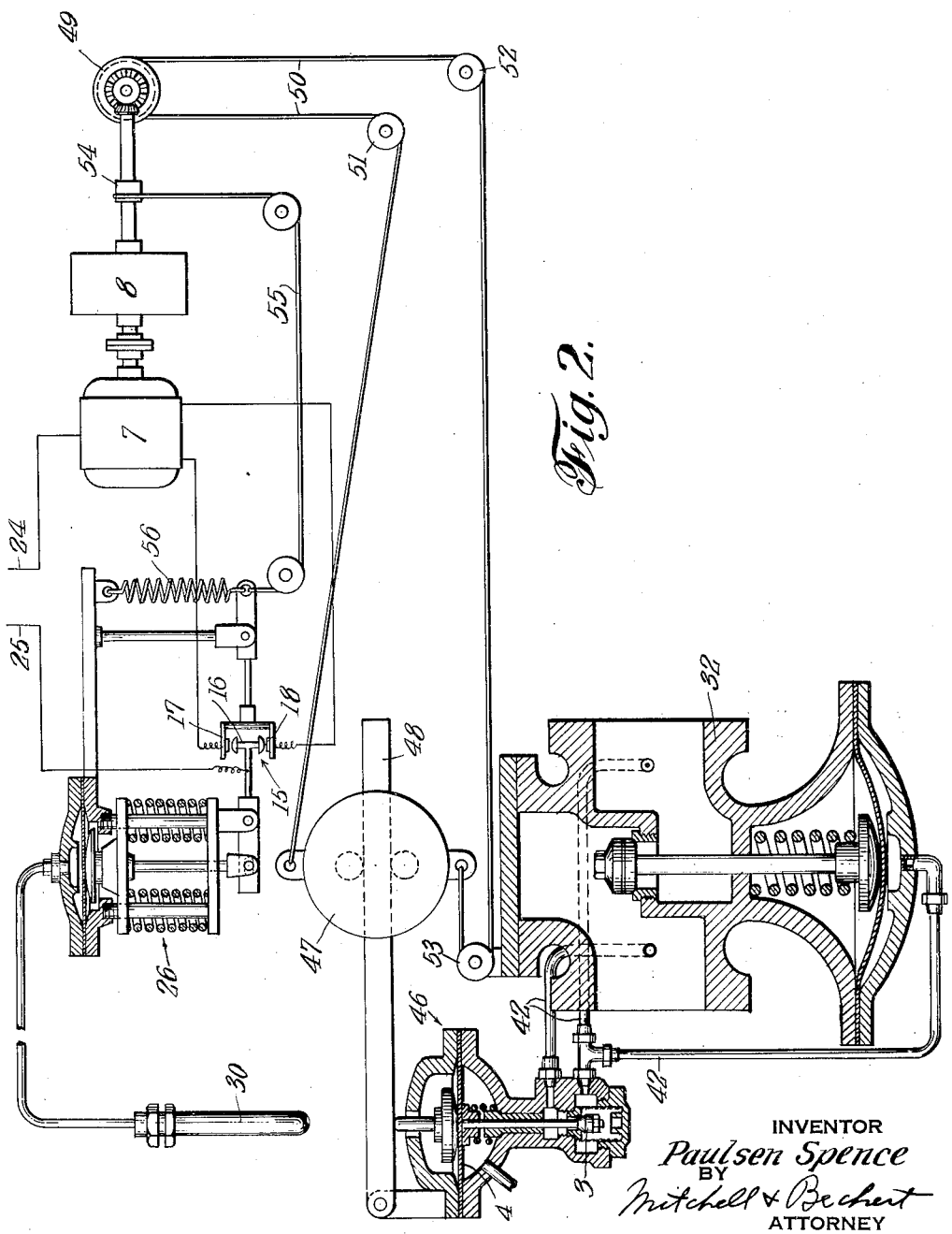
Fig. 2 is a central sectional view, partly in elevation, of an automatic valve having a weight loaded pilot valve in which the position of the weight, and consequently the loading of the valve, is automatically varied inversely with the temperature at a particular point.

In Fig. 2, 46 is a weight loaded pilot valve having a weight 47 which is slidably mounted on a pivoted arm 48 which actuates the valve head. The motor 7 moves the weight 47 in either direction on the arm 48 according to the direction of rotation of the motor. In the form shown, the motor operates through appropriate gearing the drum 49, upon which is wound a cable 50. The cable 50 passes over pulleys 51, 52, and 53, and its opposite ends are connected to the weight 47. The contacts 16, 17, and 18 of the switch 15, and the motor 7, and the source of electrical supply, are so connected that when contact is made between contacts 16 and 18 the motor runs in the direction to move the weight 47 further out on the arm 48 so as to increase the loading of the valve, and when contact is made between contacts 16 and 17 the motor runs in a direction to move the weight 47 in the opposite direction on the arm 48 so as to decrease the loading of the valve. The motor 7 also operates to move either the center contact or the outside contacts of the switch 15. The remaining contact or contacts of the switch are operated by the thermostat 26. In the form shown, the motor operates a drum 54 upon which is wound a cable 55, one end of which is attached to the drum 54, and the other end of which operates the contacts 17 and 18 in one direction. The cable 55 is kept taut and the contacts 17 and 18 are operated in the opposite direction by the spring 56. The contact 16 is moved by the thermostat 26. Other parts of the apparatus shown in Fig. 2 which are the same as in Fig. 1 are numbered the same as in Fig. 1.

The apparatus shown in Fig. 2 operates as follows:

If the temperature of the outside air becomes less, the thermostat 26 makes contact between the contacts 16 and 18 so that the motor operates to move the weight 47 further out on the pivoted arm 48, thus increasing the loading of the valve 46. As the motor operates, the cable 55 will be unwound from the drum 54, and the spring 56 will move the contacts 17 and 18 so as to break the contact between the contacts 16 and 18 after the weight 47 has been moved a slight distance. If the outside temperature falls further, this process will be repeated and the weight 47 will be moved further out on the arm 48. Similarly, if the outdoor temperature increases, the thermostat will close contact between the contacts 16 and 17. The motor 7 will then operate in the opposite direction so as to move the weight 47 inwardly towards the valve so as to decrease the loading of the valve until the contact 17 is moved by the motor sufficiently so as to break the contact between the contacts 16 and 17. From the foregoing description it will be seen that the loading of the valve will be varied in inverse relation to the temperature of the outside air. When the valve 46 is used as a direct acting reducing valve and its diaphragm chamber is connected to its outlet side, the pressure on the outlet side will vary in inverse relation to the outside temperature. When the valve 46 is used as a pilot valve as shown in the figure, and its diaphragm chamber is connected to the outlet side of the main valve, the pressure on the outlet side of the main valve will vary in inverse relation to the outside temperature.

Figure 3:
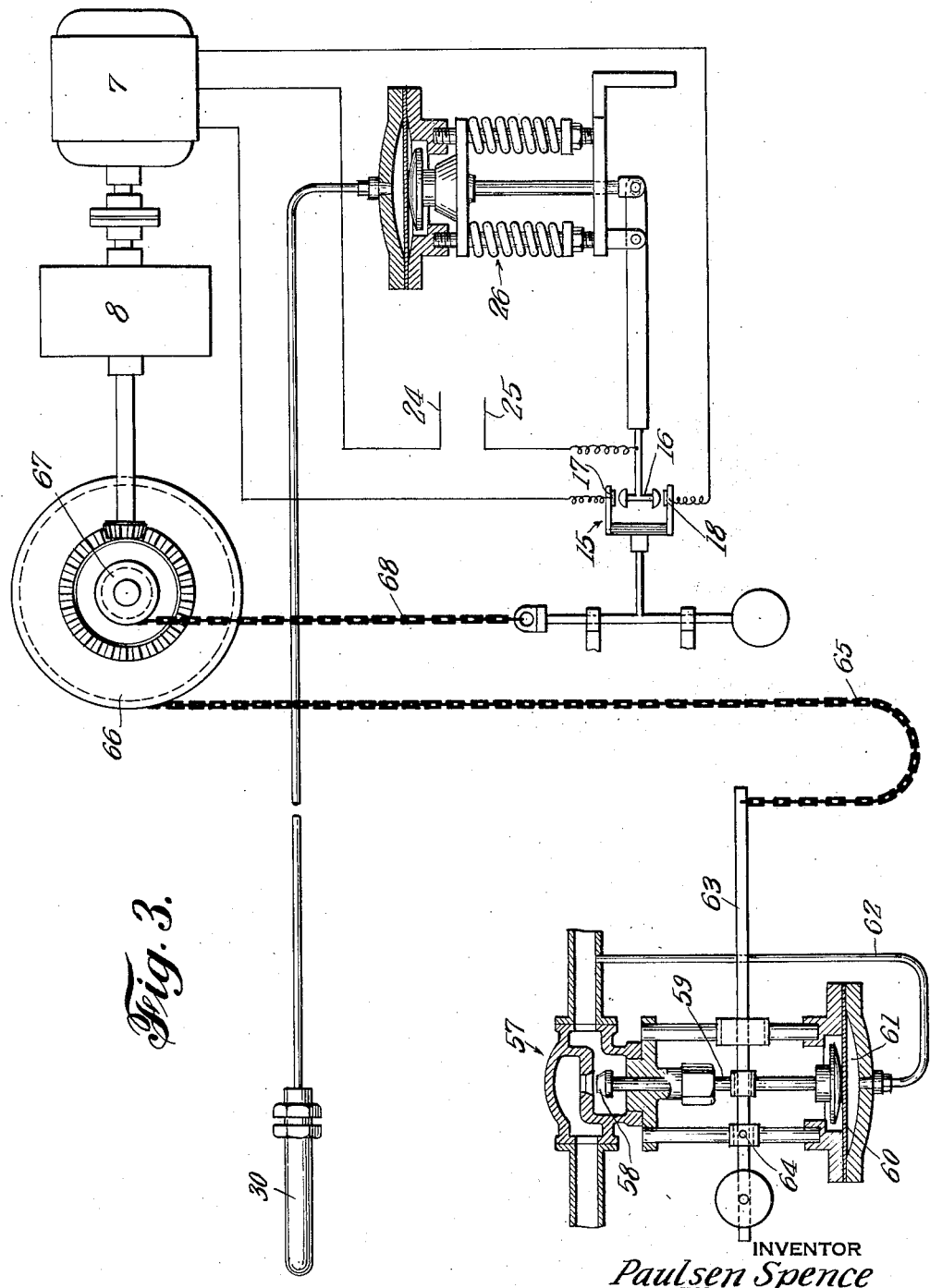
Fig. 3 is a central sectional view, partly in elevation, of an automatic weight loaded main valve in which the loading of the valve is varied by the positioning of a chain or cable so as to automatically vary the loading of the valve inversely with the temperature at a particular point.

In Fig. 3, 57 is a weight loaded valve in which the loading of the valve is varied by the positioning of a chain or cable. 58 is a valve head and 59 is a valve stem. The valve head 58 is operated in one direction by means of a diaphragm 60. 61 is a diaphragm chamber which is connected by means of a pipe 62 to the outlet side of the valve. The valve head 58 is operated in the opposite direction by means of an arm 63 which is pivoted at 64 and which is operatively connected to the valve stem 59. 65 is a chain or heavy cable, one end of which is connected to the arm 63, and the other end of which is connected to a drum 66 upon which it can be wound. The motor 7 is connected by suitable gearing to the drum 66 and winds or unwinds the chain or cable 65 on the drum according to the direction of rotation of the motor. The contacts, 16, 17, and 18 of the switch 15, and the motor 7, and the source of electrical supply, are so connected that when contact is made between the center contact and one of the outside contacts the motor runs in a direction to unwind the chain or cable 65 so as to increase the loading of the valve, and when contact is made between the center contact and the other of the outside contacts the motor runs in a direction to wind up the chain or cable 65 so as to decrease the loading of the valve. The motor 7 operates to move either the center contact or the outside contacts of the switch 15. The remaining contact or contacts of the switch are operated by the thermostat 26. In the form shown, the contacting of contacts 16 and 18 will operate to unwind the chain or cable 65, and the contacting of contacts 16 and 17 will operate to wind up the chain or cable. The motor operates a drum 67 upon which is wound a cable 68, one end of which is attached to the drum 67, and the other end of which moves the contacts 17 and 18. The contact 16 is moved by the thermostatic actuator 26. Other parts of the apparatus shown in Fig. 3 which are the same as parts shown in Fig. 1 are numbered the same as in Fig. 1.

The apparatus shown in Fig. 3 operates as follows:

If the temperature of the outside air becomes less, the thermostat 26 makes contact between the contacts 16 and 18 so that the motor operates to unwind the chain or cable 65, thus increasing the loading of the valve. As the motor operates, the contact 18 will be moved so as to break the contact between the contacts 16 and 18 after the chain or cable 65 has been slightly unwound. If the outside temperature falls further, this process will be repeated and the chain or cable 65 will be unwound further. Similarly, if the outdoor temperature increases, the thermostatic actuator will close contact between the contacts 16 and 17. The motor 7 will then operate in the opposite direction so as to wind up the chain or cable 65 so as to decrease the loading of the valve until the contact 17 is moved by the motor sufficiently so as to break contact between the contacts 16 and 17. From the foregoing description it will be seen that the loading of the valve will be varied in inverse relation to the temperature of the outside air and that the pressure on the outlet side of the valve will be automatically varied in inverse relation to the outside temperature.

In Fig. 4 I show a method for controlling a pressure reducing valve so as to automatically maintain a constant pressure at a remote point. In this figure the main valve 32, the pilot valve 1, the motor 7, and the reduction gear 8, are shown placed in the basement of a tall building. 69 is a pipe on one of the higher floors of the building which receives fluid coming from the valve through the riser 70. 71 is a branch pipe leading from the riser 70 to apparatus on another floor of the building. The pipe 69 supplies fluid to apparatus on its floor in which it is desired to maintain a constant pressure. The reversing switch 15 is placed adjacent to the pipe 69. The contacts 16, 17, and 18 of the switch 15, and the motor 7, and the source of electrical supply, are so connected that when contact is made between the center contact and one of the outside contacts of the switch 15, the motor runs in a direction to increase the loading of the valve, and when contact is made between the center contact and the other of the outside contacts of the switch 15, the motor runs in a direction to decrease the loading of the valve. Within a casing 72 is a fluid pressure actuated means which is operated in one direction by the pressure in the pipe 69, and which is operated in the opposite direction by an adjustable spring 73. This fluid pressure actuated means which is similar to that shown at 4 in Fig. 1, is connected to either the center contact or the outside contacts of the switch 15. In the form shown the fluid pressure actuated means is connected to the center contact 16. The contacting of the contacts 16 and 17 will operate the motor to increase the loading of the valve so as to increase the pressure in the pipe 69, and the contacting of the contacts 16 and 18 will operate the motor to decrease the loading of the valve so as to decrease the pressure in the pipe 69.

The apparatus shown in Fig. 4 operates as follows:

If the pressure in the pipe 69 becomes less than the pressure for which the spring 73 is set, the spring 73 will operate the switch 15 so as to close contact between the contacts 16 and 17. The motor will then operate to increase the loading of the valve, thereby increasing the pressure in the pipe 69. If the pressure in the pipe 69 becomes greater than the pressure for which the adjustable spring 73 is set, the fluid pressure in the pipe 69 will act upon the pressure actuated means within the casing 72 so as to operate the switch 15 to make contact between contacts 16 and 18 with the result that the motor will operate to decrease the loading of the valve and the pressure in the pipe 69. From the foregoing description it will be seen that the loading of the valve will be automatically varied so as to maintain a constant and predetermined pressure in the pipe 69 and in the apparatus supplied thereby.

In Fig. 5 I show electrically operated means whereby the loading of a pressure reducing valve may be controlled by hand from a remote point. In this figure the main valve 32, the pilot valve 1, the motor 7, and the reduction gear 8, are the same as shown in Fig. 1. 74 represents a hand operated reversing switch which is located at a point which is remote from the valve, the motor, and the reduction gear. 75 is a contactor which is pivoted at 76 and is capable of being contacted with either of the contacts 77 or 78. The contactor 75 and the contacts 77 and 78 of the switch 74, and the motor 7, and the source of electrical supply, are so connected that when contact is made between the contactor 75 and the contact 77 the motor runs in a direction to increase the loading of the vlave, and when contact is made between the contactor 75 and the contact 78 the motor runs in a direction to decrease the loading of the valve. 79 is a rheostat which is operated by the motor 7. In the form shown a movable rheostat arm 80 is operated by the screw 13. 81 is an electric battery which is connected to the terminals of the rheostat 79, and 82 is an electric current measuring and indicating device which is in circuit with the battery 81 and the rheostat 79. The indicating device 82 is placed adjacent to the switch 74 so that the operator of the switch 74 will be able to observe from the indicating device 82 how much the loading of the valve and consequently the pressure on the discharge side of the valve has been increased or decreased by reason of the operation of the switch 74.

While the invention has been described in considerable detail and specific forms shown in the drawings, it is to be understood that the invention may be otherwise embodied and employed in connection with valves of various types other than those herein shown.

I claim:

1. In a device of the character indicated, a main valve, fluid pressure actuated means for operating said main valve, a pilot valve for controlling the flow of pressure fluid for said fluid pressure actuated means, means for urging the valve head of said pilot valve in one direction, loading means for urging the valve head of said pilot valve in the other direction, electric motor means cooperating with said pilot valve loading means to vary the loading effect thereof, and means for controlling said electric motor means, and means operable to break the electric motor circuit after said loading means has been varied.

2. In a device of the character indicated, a main valve, fluid pressure actuated means for operating said main valve, a pilot valve for controlling the flow of pressure fluid for said fluid pressure actuated means, means for urging the valve head of said pilot valve in one direction, loading means for urging the valve head of said pilot valve in the other direction, and means including thermostatic means for varying the loading effect of said pilot valve loading means, and means for rendering said loading varying means ineffective after said loading means has been varied.

3. In a device of the character indicated, a main valve, fluid pressure actuated means for operating said main valve, a pilot valve for controlling the flow of pressure fluid for said fluid pressure actuated means, means for urging the valve head of said pilot valve in one direction, loading means for urging the valve head of said pilot valve in the other direction, electric motor means cooperating with said pilot valve loading means to vary the loading effect thereof, and thermostatic means for controlling said electric motor means, and means operable by said electric motor means during load variation to render said electric motor means ineffective to further vary the loading beyond a predetermined point.

4. In a fluid pressure regulating means, a main valve, fluid pressure actuated means for moving said main valve in at least one direction, a pilot valve for controlling the flow of pressure fluid for said fluid pressure actuated means, means for urging the valve head of said pilot valve in one direction, loading means for urging said valve head in the other direction, electric motor means cooperating with said loading means for varying the loading effect of said loading means, a motor circuit, means for closing said motor circuit and means movable by said motor during loading variation for breaking said motor circuit to stop loading variation.

5. In a fluid pressure regulating means, a main valve, fluid pressure actuated means for moving said main valve in at least one direction, a pilot valve for controlling the flow of pressure fluid for said fluid pressure actuated means, means for urging the valve head of said pilot valve in one direction, loading means for urging said valve head in the other direction, reversible electric motor means cooperating with said loading means for varying the loading effect of said loading means, circuit means for said motor, settable means for closing said circuit means for causing said motor to operate in forward and reverse directions, and means operated by said motor means during its variation of said loading means for causing said circuit means to be broken and said motor stopped.

6. In a fluid pressure regulating means, a valve, fluid pressure actuated means for moving said valve in one direction, a lever and chain loading device for urging said valve in the other direction, reversible electric motor means to wind up and pay out chain of said chain loading device to vary the loading effect thereof on said valve, circuit means for said motor, means for closing said circuit means for causing said motor to operate in forward and reverse directions for winding up and paying out chain, and means operated by said motor means during operation thereof for causing said circuit means to be broken and said motor stopped.

7. In a fluid pressure regulating means, a main valve, fluid pressure actuated means for moving said main valve in at least one direction, a pilot valve for controlling the flow of pressure fluid for said fluid pressure actuated means, means for urging the valve head of said pilot valve in one direction, loading means for urging said valve head in the other direction, reversible electric motor means cooperating with said loading means for varying the loading effect of said loading means, circuit means for said motor, and settable means for closing said circuit means for causing said motor to operate in forward and reverse directions.

PAULSEN SPENCE.